(12) United States Patent
Caccaviello

(10) Patent No.: US 7,344,091 B2
(45) Date of Patent: Mar. 18, 2008

(54) SPRAYING

(76) Inventor: Leon Joseph Caccaviello, 2, River Road, Tooleybuc, New South Wales 2736 (AU)

(*) Notice: Subject to any disclaimer, the term of this patent is extended or adjusted under 35 U.S.C. 154(b) by 0 days.

(21) Appl. No.: 11/386,840

(22) Filed: Mar. 23, 2006

(65) Prior Publication Data

US 2006/0214022 A1 Sep. 28, 2006

Related U.S. Application Data

(60) Provisional application No. 60/664,586, filed on Mar. 24, 2005.

(51) Int. Cl.
*B05B 1/20* (2006.01)

(52) U.S. Cl. ............... 239/166; 239/167; 239/172; 239/176; 239/722; 239/723; 239/726; 239/548; 239/566; 47/1.7

(58) Field of Classification Search ............. 239/159, 239/164, 166, 167, 169, 122, 149, 146, 163, 239/550, 743, 723, 732, 548, 566; 47/1.7
See application file for complete search history.

(56) References Cited

U.S. PATENT DOCUMENTS

| | | | | |
|---|---|---|---|---|
| 872,654 A | * | 12/1907 | Heard | 239/167 |
| 912,966 A | * | 2/1909 | Lamiell et al. | 239/167 |
| 1,974,166 A | * | 9/1934 | Thompson et al. | 239/169 |
| 2,590,400 A | * | 3/1952 | Gollnick | 239/166 |
| 3,023,970 A | * | 3/1962 | Knoell | 239/167 |
| 4,844,346 A | * | 7/1989 | Coffey | 239/166 |

* cited by examiner

*Primary Examiner*—Dinh Q. Nguyen
(74) *Attorney, Agent, or Firm*—Birch, Stewart, Kolasch & Birch, LLP

(57) ABSTRACT

Spraying apparatus (1) is provided that has two horizontally disposed upright spray arm assemblies (33) that each carry sprayers (43). Each spray arm assembly (33) has a sprayer (43) in an upper part (35) and a sprayer (43) in a lower part (37). The upper part (35) is able to move relative to the lower part (37) so the axis of spraying from the upper part (35) will be downwardly directed towards an upper part of crop to be sprayed. The spray arm assemblies (33) are mounted on respective arms (25) for moving laterally inwardly or outwardly relative to a longitudinal direction of a row of crop to accommodate for different width crops and/or different crop row widths.

10 Claims, 4 Drawing Sheets

SPRAYING

Figure 1:
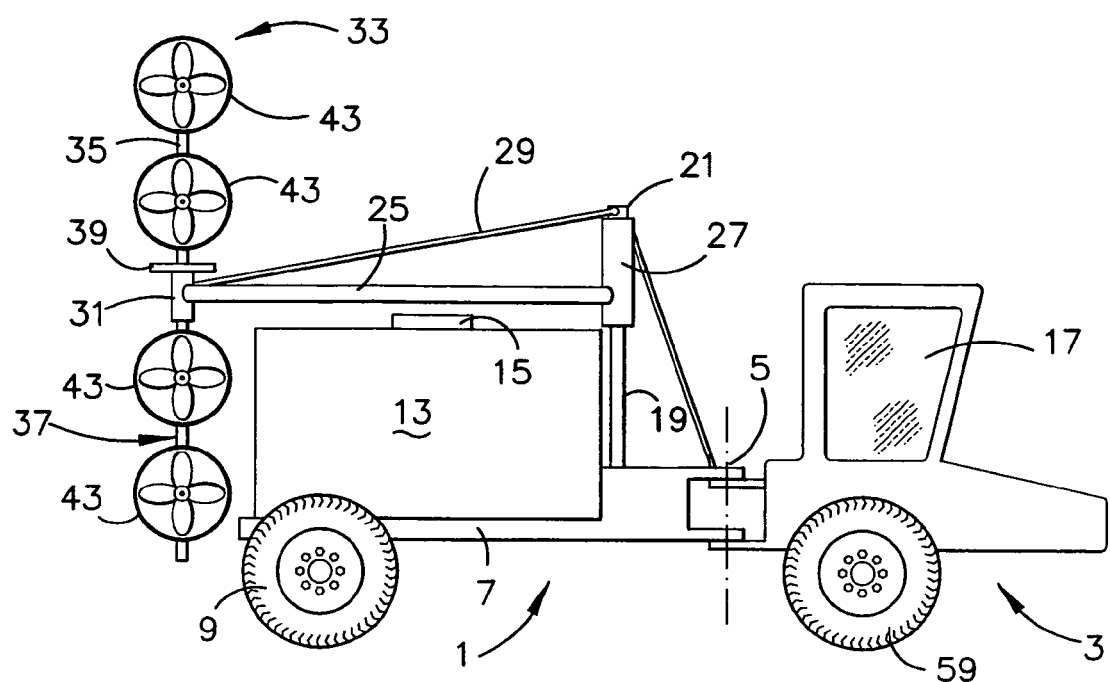

This application claims the benefit of priority from U.S. provisional application No. 60/664,586 filed in the name of Leon Joseph Caccaviello on 24 Mar. 2005. The whole of the subject matter therein is incorporated herein by reference.

FIELD OF THE INVENTION

This invention relates to spraying of agricultural crops and relates particularly but not exclusively to spraying of tall agricultural crops such as fruit trees.

Hitherto, apparatus has been provided for spraying tall agricultural crops such as fruit trees planted in rows. Typically, an orchard will have multiple rows of trees. The prior apparatus has included a pair of arms one of which overhangs a row of trees on a left side of the apparatus and the other overhangs a row of trees on a right side of the apparatus as the apparatus traverses longitudinally between the rows. The wings of the apparatus have an upper horizontally extending part that passes over the top of the crop, and a lower upright extending part which carries sprays so that spray liquid can be sprayed onto the trees. Quite often, the height of the crop varies and in the case where the crop is of lower height than other crop, the spray is discharged above the crop and considerable spray does not reach the crop and is wasted. Further, because the wings are fixed relative to a prime mover of the apparatus, it has been difficult to move the apparatus within the orchard between the rows as the apparatus leaves one path between adjacent rows to turn around and move in the opposite direction between adjacent rows. Further, general road transport of the apparatus has been difficult owing to the bulky nature of the wings and their width that extends transversely of the direction of travel of the apparatus.

There is a need for a different arrangement of spraying apparatus.

STATEMENTS OF THE INVENTION

Therefore, according to one aspect of the present invention there is provided spraying apparatus for spraying agricultural crops, particularly but not exclusively fruit trees, planted in adjacent rows where the apparatus will, in use, pass between adjacent rows in a direction parallel to the rows, said apparatus having two horizontally spaced upright spray arm assemblies each with sprayers attached thereto, one spray arm assembly, in use, holding sprayers facing one row of the crop and the other spray arm assembly, in use, holding sprayers facing an adjacent row of the crop, each spray assembly having a sprayer in an upper part, and a sprayer in a lower part, spray arm assembly first moving means able to move an upper part of at least one of the spray arm assemblies relative to a lower part of the spray arm assembly so a central axis of spraying from the sprayer in the upper part will be directed in a downward direction toward an upper part of the crop, and spray arm assembly second moving means able to move the upper part and the lower part of at least one of the spray arm assemblies as a whole laterally inwardly or outwardly relative to the longitudinal direction of the row to accommodate for different width crops and/or different crop row widths.

In one example, the upper part of each spray arm assembly is articulated to a respective lower part of the spray arm assembly so said upper part can swing relative to the lower part about a generally horizontally extending axis.

The upper part of each spray arm assembly has at least two sprayers, and the lower part of each spray arm assembly has at least two sprayers.

The spray arm assemblies are carried by respective supporting arms that extend in a generally horizontal direction, said supporting arms being swing connected to the apparatus so they can swing in a generally horizontally extending plane laterally inwardly and outwardly relative a central longitudinal axis of the apparatus and carry the respective spray arm assemblies, and wherein said second moving means is able to move the supporting arms so the spray arm assemblies, in turn, move as a whole laterally inwardly or outwardly.

The spray arm assemblies are carried by the supporting arms by a connection that is proximate to the generally horizontally extending axis where the upper part can swing relative to the lower part, so the lower part hangs downwardly from said connection and said upper part extends upwardly from said connection.

The swing arms are interconnected by a linkage that permits uniform interlinked swinging of both supporting arms inwardly or outwardly of said apparatus.

Each spray arm assembly is connected with a tracking mechanism to rotate the lower part about a generally upright axis as the supporting arms are moved inwardly and outwardly, whereby a central axis of spraying from each sprayer will be generally perpendicular to the direction of the crop rows.

The apparatus includes a tank for spray liquid and wherein said tank is disposed between said spray arm assemblies.

Each supporting arm is connected to the apparatus at a forward end of the apparatus relative to a direction of intended travel of the apparatus and so the supporting arms extend in a direction rearwardly.

The supporting arms can be swung to be generally parallel to one another and wherein the length of the supporting arms is such that when swung to this condition, both spray arm assemblies will be positioned at a rear of the apparatus behind the tank, whereby to minimise the width dimensions of the apparatus to facilitate movement of the apparatus when spraying is not being performed.

The upper part of each spray arm assembly can be released from said first moving means so when said supporting arms are swung to be generally parallel to each other, the upper parts can be swung about the generally horizontally extending axis where they are articulated so the upper parts lie over a top of the apparatus and extend in a direction forwardly of the apparatus, whereby to minimise the height dimensions of the apparatus to facilitate movement of the apparatus when spraying is not being performed.

The apparatus is attached to a prime mover by a hitch so there will be an integrated prime mover and apparatus, and where said prime mover has two wheels and where said apparatus has two wheels.

An engine of said primer mover is disposed at a position so a centre of mass of said prime mover is forward of the prime mover wheels and where the apparatus wheels are rearward of the apparatus whereby a moment force will be applied from the centre of mass of the prime mover in an upward direction to the hitch to assist maintaining the apparatus against downward movement relative to the hitch, the arrangements also permitting for a sharp turning circle of the integrated prime mover and apparatus, and minimal tail swing of the apparatus that would otherwise occur if the apparatus wheels were closer to a front of the apparatus.

Figure 2:
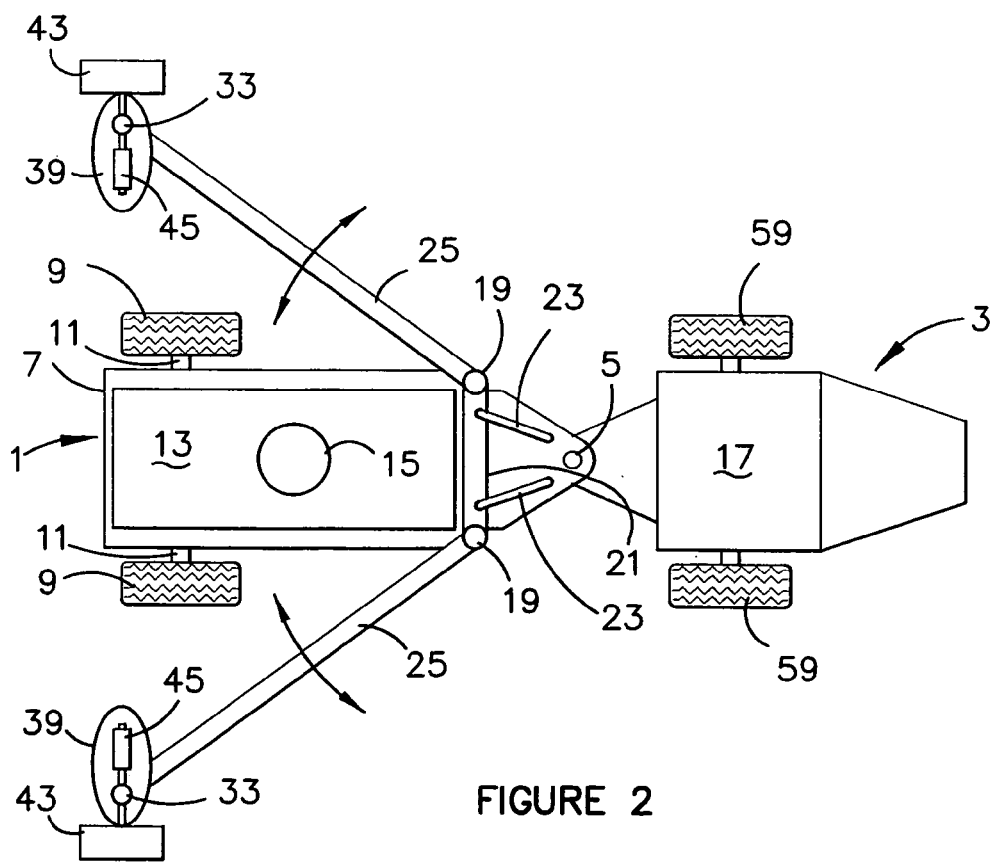
Figure 3:
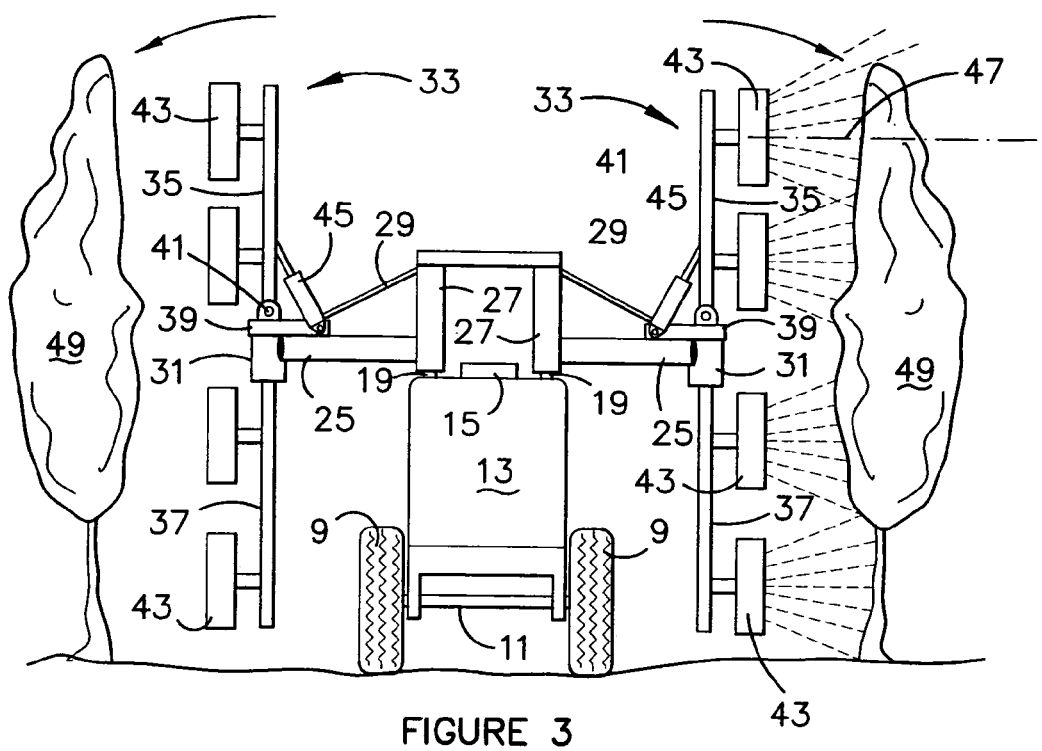
Figure 4:
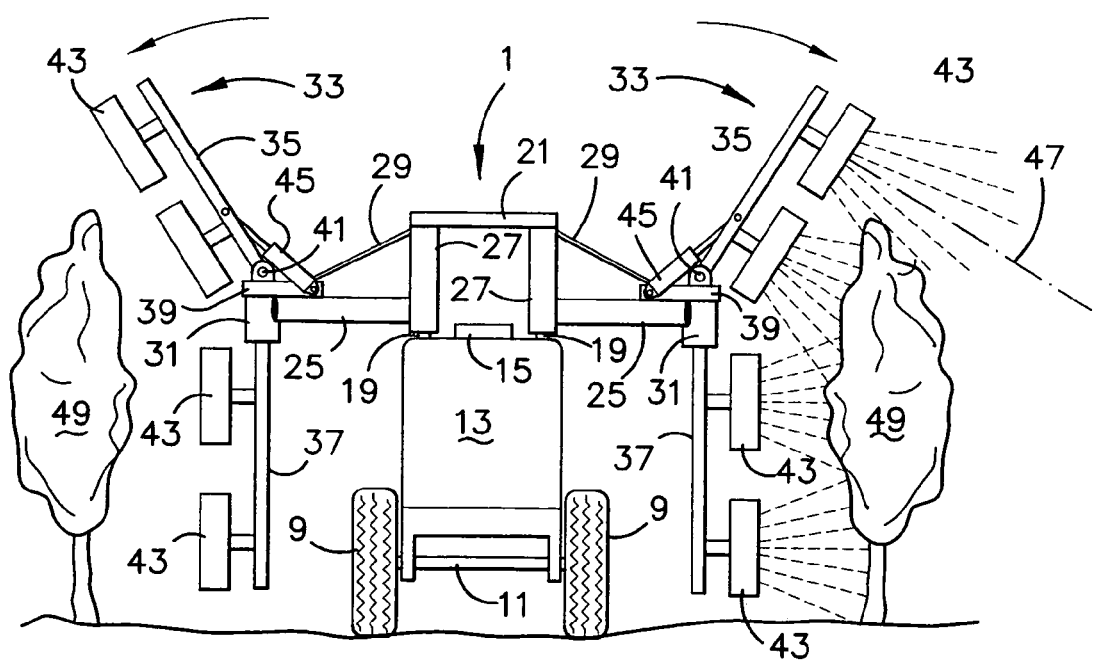
Figure 5:
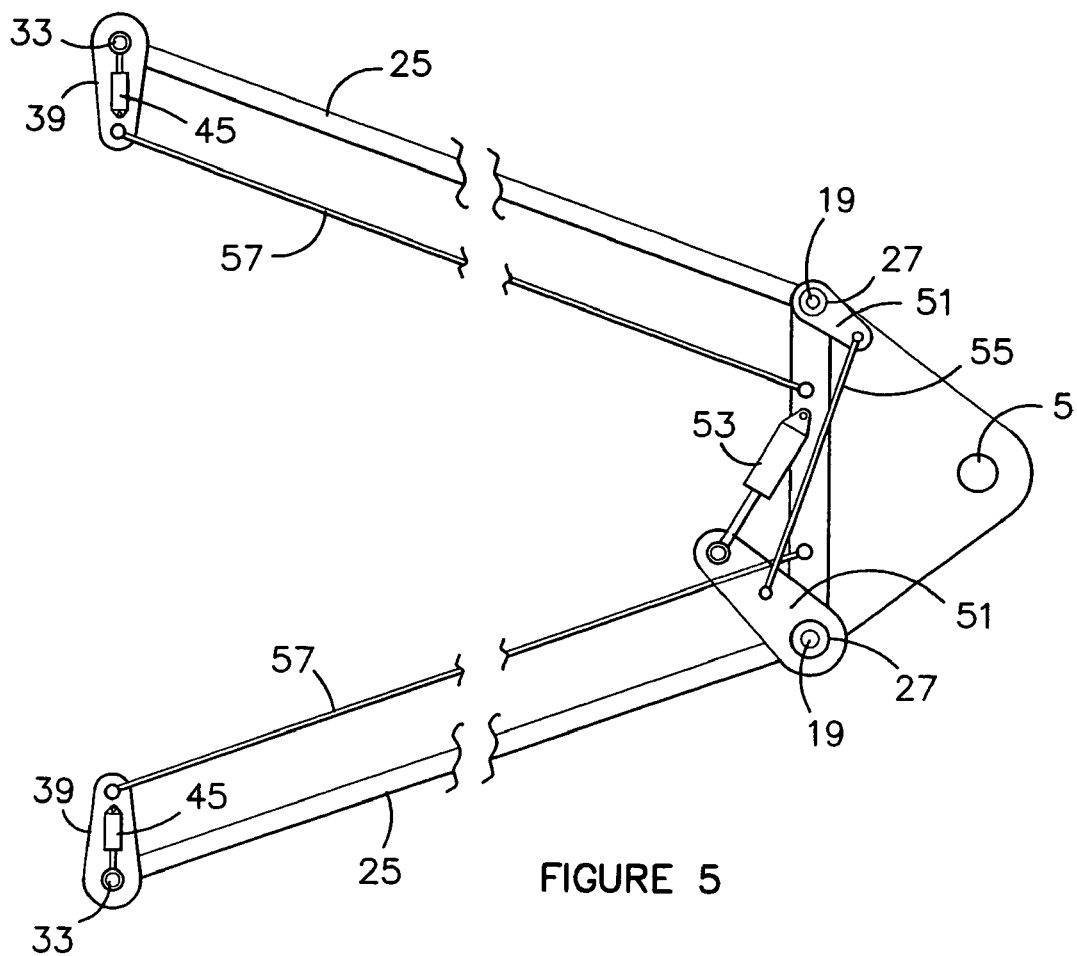
Figure 6:
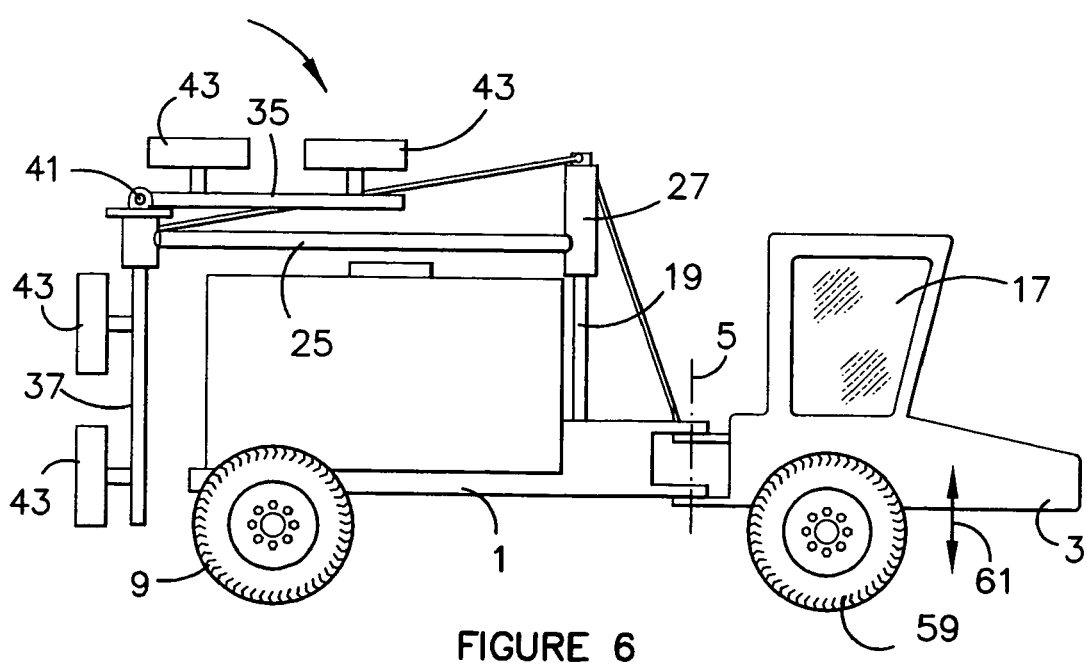
Figure 7:
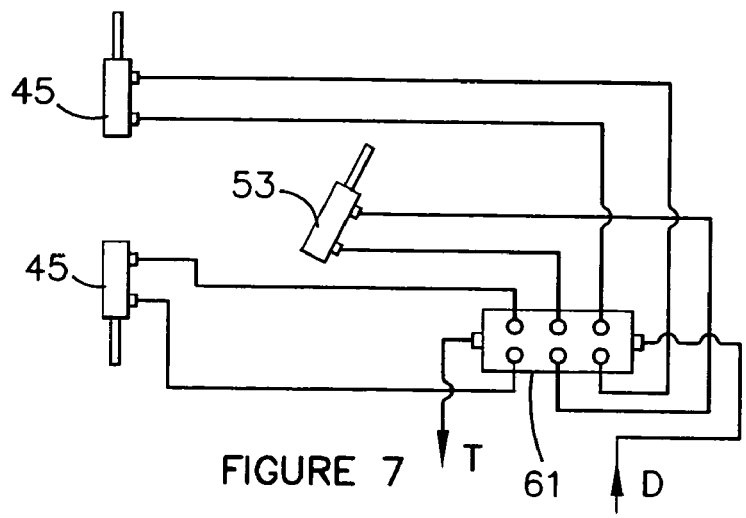
Figure 8:
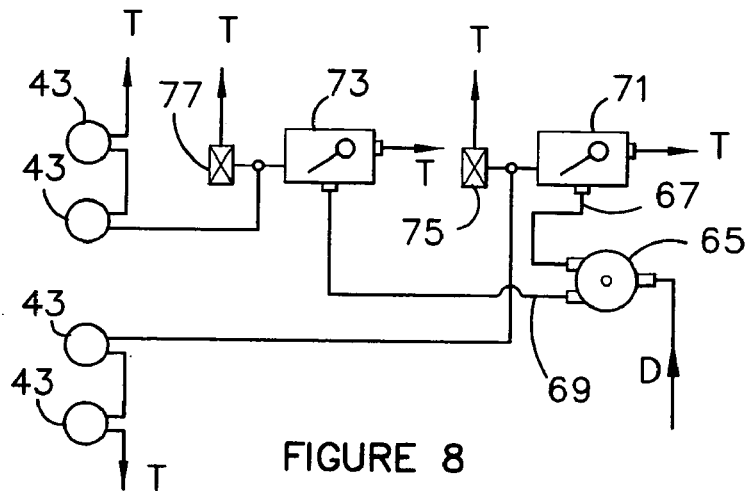
Figure 9:
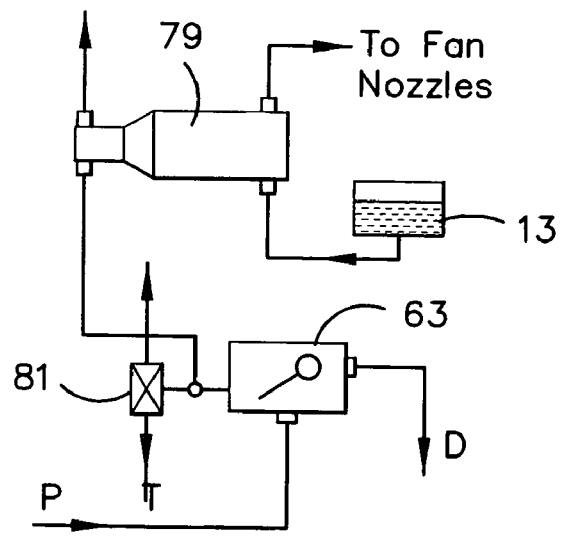

In order that the invention can be more clearly ascertained, an example of a preferred embodiment will now be described with reference to the accompanying drawings wherein:

FIG. 1 is a side elevation view of one example of apparatus for spraying crop such as fruit trees, FIG. 2 is a plan view of the apparatus shown in FIG. 1, FIG. 3 is an end elevation of the apparatus showing the spraying of tall crops such as fruit trees, FIG. 4 is a view similar to FIG. 3 but showing spraying of lower height crop such as lower height fruit trees than shown in FIG. 3, FIG. 5 is a detailed schematic diagram showing supporting arms that carry spray arm assemblies, FIG. 6 is a side elevational view of the apparatus showing the supporting arms swung to minimise the width and height dimensions of the apparatus to facilitate movement of the apparatus when spraying is not being performed, FIG. 7 is a hydraulic circuit diagram showing operation of various rams in the apparatus, FIG. 8 is a further hydraulic circuit diagram showing operation of fans that disperse spray into the atmosphere from sprayers mounted on the apparatus, and FIG. 9 is a further hydraulic circuit diagram showing how spray liquid is pumped to fan nozzles.

Referring generally to FIGS. 1-4, it can be seen that the example of the apparatus 1 is attached with a prime mover 3 through a hitch 5. The apparatus has a chassis part 7 carried by grounding engaging wheels 9 that have an axle 11 suitably mounted to the chassis 7. The chassis 7 carries a spray liquid tank 13 in which spray to be sprayed onto the crops can be carried. The spray tank has a filling lid 15. The prime mover 3 has an air conditioned cabin 17 with filtered air circulation. This substantially inhibits the driver of the prime mover 3 from inhaling spray that would otherwise pass into the cabin 17.

The chassis 7 has a pair of upright frame arms 19 at a forward end relative to the hitch 5. The upright frame arms 19 are interconnected at the top with a cross arm 21. A pair of struts 23 interconnect between the cross arm 21 and the chassis at a point adjacent the hitch 5 and provide rigidity to the frame arms 19. This is clearly shown in FIG. 2. FIG. 2 also shows that each of the upright frame arms 19 is displaced at a forward end of the apparatus relative to the hitch 5 and in front of the spray tank 13. Each of the upright frame arms 19 carries a respective supporting arm 25 which is mounted for swinging about an upright central longitudinal axis of each of the upright frame arms 19. Thus, each of the supporting arms 25 can swing relative to the apparatus 1 in a generally horizontally extending plane. A collar 27 is received over the outside of each of the upright frame arms 19 and the supporting arms 25 are welded thereto. Thus, the collars 27 act as supports and bearings for the supporting arms 25 in their swinging motion. It can be seen that the collars 27 extend downwardly from the cross arm 21 at the top of the upright frame arms 19. Each of the supporting arms 25 is welded to a lower part of a respective collar 27. A pair of supporting struts 29 connect with an outer extremity of each of the supporting arms 25 and an upper part of the collars 27. This provides for maintaining each of the supporting arms 25 at a generally horizontally extending position. The struts 29 have been shown only in some of the figures in order to aid clarity. The outer or free ends of each of the supporting arms 25 carries a spray assembly collar 31 which is suitably welded to each of the respective supporting arms 25.

A spray assembly shown generally by numeral 33 comprises an upper part 35 and a lower part 37. Each of the upper parts 35 and lower parts 37 are elongate tubes. The top of the lower part 37 carries a swing plate 39 fixed thereto. The upper part 35 is swing connected relative to the lower part 37 so it can articulate and swing about a generally horizontally extending axis 41 (see FIGS. 3 and 4). Thus, the upper part 35 is physically swing connected relative to the lower part 37 at the top of the lower part 37. Each of the spray assemblies 33 includes sprayers 43. The sprayers 43 are known spraying devices sold under the name Quantom Mist Fan Type HP-219E from Croplands, Crnr Cavan and Duncan Roads, Dry Creek 5094, South Australia. Each sprayer 43 has a motor driven fan to move air through the sprayers 43. The sprayers 43 also contain individual spray nozzles spaced around an outer perimeter. Thus, when spray liquid is sprayed from the nozzles, the fans move air through the sprayers 43 and disperse the spray outwardly of the apparatus towards the crops such as fruit trees. Typically, the fan motors are driven by hydraulic fluid from a hydraulic pump carried by the apparatus/prime mover. Spray is ejected from the spray nozzles by a suitable pump driven by a hydraulic fluid from a hydraulic pump carried by the apparatus/prime mover.

Respective hydraulic rams 45 are connected between a part of the swing plate 39 and a part of the upper part 35 of the spray assembly 33. This is shown in FIGS. 2, 3 and 4. Thus, as the spray assembly 33 is carried by the supporting arms 25 at an upper part of the lower part 37 of the spray assembly 33, the upper part 35 can be caused to swing about the horizontally extending axis 41 in a direction inwardly or outwardly by the rams 45 retracting or extending. Thus, it is clear that the spray assemblies 33 are carried by the supporting arms 25 proximate to the generally horizontally extending axis 41. In this arrangement, the lower part 37 hangs downwardly from the connection at the collar 31 and the upper part 35 extends upwardly from the connection of the collar 31. Thus, the upper part 35 is able to be moved by moving means, comprising the rams 45, relative to the lower part 37 so that a central axis of spraying from the sprayers 35 in the upper part 35 will be directed in a downward direction towards an upper part of the crop. This is shown in FIG. 4 where the central axis 47 of the sprayers 43 in the upper part 35 are directed in a downward direction towards an upper part of the crop 49. Here, in FIG. 4, the crop 49 (being diagrammatic and representative of a fruit tree crop) is of lower height than the crop 49 shown in FIG. 3. In FIG. 3, it is seen that the upper part 35 is moved by the moving means, being the rams 45, so that the upper part 35 is directly upright above the lower part 37. It can be seen in FIG. 3 that the central axis of spraying of each of the sprayers 43 is generally horizontal.

In the example, there are two sprayers 43 in the upper parts 35 and two sprayers 43 in the lower parts 37. If desired, a single sprayer 43 may be provided on each of the upper parts 35 and lower parts 37. Alternatively, other numbers of sprayers 43 may be utilised in the upper parts 35 and lower parts 37. Further, different numbers of sprayers 43 may be utilised in the upper parts 35 relative to the lower parts 37.

The supporting arms 25 are able to swing in a generally horizontal plane, as noted previously. This swinging enables the spray assemblies 33 to move laterally inwardly and outwardly relative to a central longitudinal axis of the apparatus. This, in turn, causes the spray arm assemblies 33 to be carried as a whole laterally inwardly or outwardly relative to the apparatus 1. Thus, as the apparatus 1 is moved between adjacent rows of crop 49, the supporting arms 25 can be moved inwardly or outwardly to, in turn, move the spray assemblies 33 inwardly or outwardly, placing the sprayers 43 in a position to maximise the spraying of the crops 49 and to adjust for different width spacing of the rows of the crop.

FIG. 5 shows how the supporting arms 25 are able to swing. The sprayers 43 have been omitted from FIG. 5 in order to aid clarity of the figure. Swing plates 51 are physically connected relative to the collars 27. A moving means comprising a ram 53 is connected with an outer free end of one of the swing plates 51 and a cross arm between the upright frame arms 19. It should be noted that the swing plates 51 and the ram 53 have not been shown in FIG. 1, 2, 3 or 4 in order to aid clarity of those figures. A link arm 55 is pivotally connected to each of the respective swing plates 51 at equal radius distances from the respective upright axis of swinging of supporting arms 25. Thus, as the ram 53 is extended or retracted, the supporting arms 25 are moved laterally inwardly and outwardly relative to a central longitudinal axis of the apparatus in a uniform linked manner. Thus, the supporting arms 25 move the spray arm assemblies 33 as a whole laterally inwardly or outwardly of the apparatus 1. Further, each of the swing plates 39 is connected at its outer end with a further link arm 57 which, in turn, connects with a fixed part of the apparatus 1 in a pivotal manner. Thus, as the supporting arms 25 are moved inwardly and outwardly by the moving means, being the ram 53, the swing plates 39 are caused to track together. This causes the spray assemblies 33 to rotate about a generally upright axis of the collars 31 (and the central longitudinal axis of the lower parts 37), so that a central axis 47 of spraying from the sprayer 43 is maintained generally perpendicular to the direction of the row of the crops. In other words, the sprayers 43 are rotated about an upright axis so that they are all facing generally perpendicular to the direction of travel of the apparatus 1 and generally perpendicular to the direction of the crop rows 49.

Referring now to FIG. 6, it is shown how the spray assemblies 33 can be moved for general transport of the apparatus/prime mover when not spraying crops. This minimises the width and height of the apparatus and makes for relatively easy movement when not spraying crops compared to if the spray assemblies 33 were in a generally spraying, in use, condition. Here, the supporting arms 25 have been moved to lie generally parallel to one another and parallel with the longitudinal central axis of the apparatus/prime mover. It can be further seen that the upper parts 35 have been swung about the generally horizontally extending axes 41, so that the upper parts 35 lie over a top of the apparatus 1 and extend in a direction forwardly of the apparatus 1. It should also be noted that the sprayers 43 in the lower part 37 are now rearwardly facing away from the apparatus. Thus, the spray assembly 33 has been rotated about a generally upright axis to enable the sprayers 43 to be oriented in this way. In order to achieve the necessary swing of the upper part 35 forwardly of the apparatus and the movement of the sprayers 43 to be rearwardly facing, it is necessary to release the coupling with the link arms 57, and the rams 45. Suitable quick release mechanisms may be provided for this purpose.

FIG. 6 also shows that the ground engaging wheels 9 of the apparatus 1 are situated rearwardly of the apparatus 1. FIG. 6 also shows that ground engaging wheels 59 of the prime mover 3 are positioned to be relatively close to the hitch 5. This arrangement permits for a tight turning circle which is needed when the apparatus/prime mover reaches an end of travel of rows and needs to turn to move through an adjacent set of rows or crop. Further, because the ground engaging wheels 9 are at the rear of the apparatus 1, there is minimal overhang and tail swing of the apparatus 1 that would otherwise occur if the apparatus 1 wheels 9 were closer to the front of the apparatus. This minimises possible crop damage from the overhanging of the tail end of the apparatus. In addition, FIG. 6 shows that a centre of mass 61 of the prime mover 3 is situated forwardly of the drive axis of the ground engaging wheels 59. This, in turn, provides a moment force in an upward direction to the hitch 5 to assist maintaining the apparatus 1 against downward movement relative to the hitch 5.

Referring now to FIG. 7, there is a hydraulic circuit diagram showing operation of the respective rams 45, and 43. FIG. 7 shows a hydraulic controller 61 used for providing hydraulic fluid to the respective rams 45, 53. The symbol D and the symbol T are respectively for hydraulic Divided Pressure or hydraulic Tank which are conventional hydraulic circuit indications for hydraulic circuit lines. From FIG. 7 it can be deduced that rams 45 may be operated independently of each other, thus permitting the upper parts 35 of the spray assembly 33 to move independently and not in unison if required.

Referring now to FIG. 8, there is shown a hydraulic circuit diagram for driving the fan motors of the sprayers 43. Here, fluid under pressure is supplied via D from a flow divider 63 (See FIG. 9). The fluid is provided to a gear divider 65 which supplies two fluid outlets 67, 69 which are provided for driving the lower sprayer motors 43 and the upper sprayer motors 43 respectively. Only the sprayer motors 43 on one side of the apparatus have been shown. A similar arrangement is provided for sprayers 43 on the opposite side of the apparatus. Thus, fluid under pressure travels through outlets 67, 69 to respective flow dividers 71, 73. The flow dividers 71, 73 allow for control of the speed of the sprayer motors 43, and any excess hydraulic fluid is supplied directly back to the Tank. The flow dividers allow for adjustment of the sprayer motors 43 so that the fans can be adjusted to suit particular crops. Solenoid control valves 75/77 are provided with the respective flow dividers 71, 73 to cause hydraulic fluid to flow directly back to the tank T in the event that respective fan motors 43 in the upper part, or the lower part are not required to be operated.

FIG. 9 shows the hydraulic circuitry for driving a pump 79 which supplies spray fluid under pressure from the tank 13. Here, a flow divider 63 is provided and supplies the D fluid outputs to the hydraulic circuit shown in FIGS. 7 and 8. The flow divider 63 receives hydraulic fluid under pressure P from a main hydraulic pump carried by the apparatus/prime mover. The output from the flow divider 63 passes to the pump 79 and the correct pump RPM is controlled from the flow divider 63. A solenoid valve 81 is provided to cause hydraulic fluid to return to the tank in the event the pump 79 is not required to be operated.

Modifications may be made to the invention as would be apparent to persons skilled in the agricultural sprayer arts. For example, the apparatus/prime mover may have drive motors for each of the ground engaging wheels 59. Thus, the apparatus/prime mover may be a four wheel drive device. Alternatively, it may be a two wheel drive device where the apparatus 1 is towed behind the driven prime mover 3. Further, the prime mover 3 may have four ground engaging wheels 59. Further, instead of mounting the supporting arms 25 so they swing about an upright axis forwardly of the apparatus 1, they may be mounted so that they swing about a rearwardly positioned upright axis and extend forwardly. Whilst each spray assembly 33 has been shown as linked to upper part 35 and lower part 37, each of the parts may be separately mounted and not interconnected. Further, whilst each spray assembly 33 has been shown with an upper part 35 and a lower part 37, it may be provided with three or more parts, where the third and further parts are mounted one above the other at the upper end of the upper part 35, and each mounted for swinging about a respective generally horizontally extending axis, and swingable by respective rams 45. In this way, the spray assemblies may be "shaped" to the general contour of the trees in the crop. This is particularly useful for trees such as avocado trees and other similar large tree crops.

These and other modifications may be made without departing from the invention, the nature of which is to be determined from the foregoing description.

The invention claimed is:

1. Spraying apparatus for spraying agricultural crops, planted in adjacent longitudinally directed rows where the apparatus will, in use, travel between adjacent rows in a direction parallel to the rows, said apparatus having two horizontally spaced upright spray arm assemblies each with sprayers attached thereto, one spray arm assembly, in use, holding sprayers spaced from and facing one row of the crop and the other spray arm assembly, in use, holding sprayers spaced from and facing an adjacent row of the crop, each spray assembly having an upper part and a lower part and a sprayer in each of the upper part and the lower part, spray arm assembly first moving means able to cause movement of the upper part of at least one of the spray arm assemblies relative to the lower part of the spray arm assembly so a central axis of spraying from the sprayer in the upper part will be directed in a downward direction toward an upper part of the crop, and spray arm assembly second moving means able to cause movement of the upper part and the lower part of at least one of the spray arm assemblies as a whole laterally inwardly or outwardly relative to the longitudinal direction of the facing row to accommodate for different width crops and/or different crop row widths.

2. Apparatus as claimed in claim 1 wherein the upper part of each spray arm assembly is articulated to the respective lower part of the spray arm assembly so the upper part can swing relative to the lower part about a generally horizontally extending axis.

3. Apparatus as claimed in claim 1 wherein the spray arm assemblies are carried by respective supporting arms that extend in a generally horizontal direction, said supporting arms being swung connected to the apparatus so they can swing in a generally horizontally extending plane laterally inwardly and outwardly relative a central longitudinal axis of the apparatus and carry the respective spray arm assemblies, and wherein the second moving means is able to move the supporting arms so the spray arm assemblies, in turn, move as a whole laterally inwardly or outwardly.

4. Apparatus as claimed in claim 3, wherein the upper part of each spray arm assembly is articulated to the respective lower part of the spray arm assembly so the upper part can swing relative to the lower part about a generally horizontally extending axis and wherein the spray arm assemblies are carried by the supporting arms by a connection that is proximate to the generally horizontally extending axis where the upper part can swing relative to the lower part, so the lower part hangs downwardly from said connection and the upper part extends upwardly from said connection.

5. Apparatus as claimed in claim 3 wherein each spray arm assembly is connected with a tracking mechanism to rotate the lower part about a generally upright axis as the supporting arms are moved inwardly and outwardly, whereby a central axis of spraying from the sprayer of the lower part of each spray arm assembly will be generally perpendicular to the direction of the longitudinal crop rows.

6. Apparatus as claimed in claim 3 wherein each supporting arm is connected to the apparatus at a forward end of the apparatus relative to a direction of intended travel of the apparatus and so the supporting arms extend in a direction rearwardly from the forward end.

7. Apparatus as claimed in claim 3 wherein said supporting arms can be swung to be generally parallel to one another and wherein the length of the supporting arms is such that when swung to this position, both spray arm assemblies will be positioned at a rear end of the apparatus behind a tank for spraying liquid carried by said apparatus, whereby to minimize the width dimensions of the apparatus to facilitate movement of the apparatus when spraying is not being performed.

8. Apparatus as claimed in claim 7 wherein the upper part of each spray arm assembly is articulated to the respective lower part of the spray arm assembly so the upper part can swing relative to the lower part about a generally horizontally extending axis wherein the upper part of each spray arm assembly can be released from the first moving means so when the supporting arms are swung to be generally parallel to each other, the upper parts can be swung about the generally horizontally extending axis where they are articulated so the upper parts lie over a top of the apparatus and extend in a direction forwardly of the apparatus, whereby to minimize the height dimensions of the apparatus to facilitate movement of the apparatus when spraying is not being performed.

9. Apparatus as claimed in claim 7 attached to a prime mover by a hitch so there will be an integrated prime mover and apparatus, and where said prime mover has two wheels and where said apparatus has two wheels.

10. Apparatus as claimed in claim 9 wherein an engine of said primer mover is disposed at a position so a centre of mass of said prime mover is forward of the prime mover wheels and where the apparatus wheels are rearward of the apparatus whereby a moment force will be applied from the centre of mass of the prime mover in an upward direction to the hitch to assist maintaining the apparatus against downward movement relative to the hitch, the arrangements also permitting for a sharp turning circle of the integrated prime mover and apparatus, and minimal tail swing of the apparatus that would otherwise occur if the apparatus wheels were closer to a front of the apparatus.

* * * * *